US012634159B2

(12) United States Patent
Zhang et al.

(10) Patent No.: US 12,634,159 B2
(45) Date of Patent: May 19, 2026

(54) METHODS, ENTITIES, AND COMPUTER READABLE MEDIA FOR ERROR HANDLING

(71) Applicant: Telefonaktiebolaget LM Ericsson (publ), Stockholm (SE)

(72) Inventors: Hong Zhang, Gothenburg (SE); Yumei Song, Gothenburg (SE); Susana Fernandez Alonso, Madrid (ES); Fuencisla Garcia Azorero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 18/250,623

(22) PCT Filed: Aug. 19, 2021

(86) PCT No.: PCT/EP2021/072998
§ 371 (c)(1),
(2) Date: Apr. 27, 2023

(87) PCT Pub. No.: WO2022/089808
PCT Pub. Date: May 5, 2022

(65) Prior Publication Data
US 2023/0403173 A1      Dec. 14, 2023

(30) Foreign Application Priority Data
Oct. 28, 2020    (WO) ................ PCT/CN2020/124565

(51) Int. Cl.
H04L 41/0894      (2022.01)
H04L 12/14      (2006.01)

(52) U.S. Cl.
CPC ...... H04L 12/1407 (2013.01); H04L 41/0894 (2022.05)

(58) Field of Classification Search
None
See application file for complete search history.

(56) References Cited

U.S. PATENT DOCUMENTS

| | | | | | |
|---|---|---|---|---|---|
| 9,450,767 | B2 * | 9/2016 | Lim | ...................... | H04M 15/66 |
| 9,497,791 | B2 * | 11/2016 | Oh | ........................ | H04W 76/20 |
| 10,341,496 | B2 * | 7/2019 | Chai | ...................... | H04L 47/70 |
| 12,425,817 | B2 * | 9/2025 | Chai | .................. | H04M 15/785 |

(Continued)

OTHER PUBLICATIONS

3GPP TS 29.512 V16.2.0, "3rd Generation Partnership Project; Technical Specification Group Core Network and Terminals; 5G System; Session Management Policy Control Service; Stage 3"; (Release 16); Sep. 27, 2019, 168 pages (Year: 2019).*

(Continued)

*Primary Examiner* — Jason D Cardone
(74) *Attorney, Agent, or Firm* — Murphy, Bilak & Homiller, PLLC

(57) ABSTRACT

The present disclosure provides methods, entities and computer readable storage media for error handling. The method at a first entity includes: determining, based on a policy decision provisioned by a second entity, that an error in at least one of: reference of a session rule and/or a Policy and Charging Control, PCC, rule to the policy decision, or an attribute in the policy decision; and transmitting, to the second entity, a notification of the error.

14 Claims, 6 Drawing Sheets

(56)            References Cited

U.S. PATENT DOCUMENTS

| | | | | |
|---|---|---|---|---|
| 2016/0127564 | A1* | 5/2016 | Sharma | H04M 15/65 |
| | | | | 455/406 |
| 2020/0037148 | A1* | 1/2020 | Wang | H04M 15/8033 |
| 2020/0221527 | A1* | 7/2020 | Bharatia | H04W 76/20 |
| 2020/0404106 | A1* | 12/2020 | Belling | H04W 8/10 |
| 2021/0219357 | A1* | 7/2021 | Talebi Fard | H04L 67/14 |
| 2022/0053364 | A1* | 2/2022 | Kim | H04W 36/14 |
| 2022/0086697 | A1* | 3/2022 | Tamura | H04W 28/24 |
| 2022/0094566 | A1* | 3/2022 | Deshpande | H04M 15/57 |
| 2022/0417724 | A1* | 12/2022 | Ding | H04W 8/08 |
| 2023/0028216 | A1* | 1/2023 | Tang | H04W 4/24 |
| 2023/0132058 | A1* | 4/2023 | Youn | H04W 4/24 |
| | | | | 370/329 |
| 2023/0292398 | A1* | 9/2023 | Song | H04W 76/30 |
| 2024/0155722 | A1* | 5/2024 | Methenni | H04W 76/20 |
| 2024/0334300 | A1* | 10/2024 | Hoffmann | H04W 36/00 |
| 2024/0397381 | A1* | 11/2024 | Ly | H04W 28/0215 |
| 2025/0150885 | A1* | 5/2025 | Song | H04L 47/20 |

OTHER PUBLICATIONS

"3rd Generation Partnership Project; Technical Specification Group Core Network and Terminals; 5G System; Common Data Types for Service Based Interfaces; Stage 3 (Release 16)", 3GPP TS 29.571 V16.5.0, Sep. 2020, 12 pages.

"3rd Generation Partnership Project; Technical Specification Group Core Network and Terminals; 5G System; Policy and Charging Control signalling flows and QoS parameter mapping; Stage 3 (Release 17)", 3GPP TS 29.513 V17.0.0, Sep. 2020.

"3rd Generation Partnership Project; Technical Specification Group Core Network and Terminals; 5G System; Policy Authorization Service; Stage 3 (Release 16)", 3GPP TS 29.514 V16.6.0, Sep. 2020, 167 pages.

"3rd Generation Partnership Project; Technical Specification Group Core Network and Terminals; 5G System; Principles and Guidelines for Services Definition; Stage 3 (Release 16) The", 3GPP TS 29.501 V16.5.0, Sep. 2020, 77 pages.

"3rd Generation Partnership Project; Technical Specification Group Core Network and Terminals; 5G System; Session Management Policy Control Service; Stage 3 (Release 16)", 3GPP TS 29.512 V16.6.0, Sep. 2020, 19 pages.

"3rd Generation Partnership Project; Technical Specification Group Core Network and Terminals; 5G System; Session Management Policy Control Service; Stage 3 (Release 17)", 3GPP TS 29.512 V17.0.0, Sep. 2019, 201 pages.

"3rd Generation Partnership Project; Technical Specification Group Core Network and Terminals; 5G System; Session Management Services; Stage 3 (Release 16)", 3GPP TS 29.502 V16.5.0, Sep. 2020, 260 pages.

"3rd Generation Partnership Project; Technical Specification Group Core Network and Terminals; 5G System; Technical Realization of Service Based Architecture; Stage 3 (Release 16)", 3GPP TS 29.500 V16.5.0, Sep. 2020, 82 pages.

"3rd Generation Partnership Project; Technical Specification Group Core Network and Terminals; 5G System; Usage of the Unified Data Repository service for Policy Data, Application Data and Structured Data for Exposure; Stage 3 (Release 16)", 3GPP TS 29.519 V16.5.0, Sep. 2020, 163 pages.

"3rd Generation Partnership Project; Technical Specification Group Core Network and Terminals; Policy and Charging Control (PCC); Reference points (Release 16)", 3GPP TS 29.212 V16.4.0, Sep. 2020, 287 pages.

"3rd Generation Partnership Project; Technical Specification Group Core Network and Terminals; T8 reference point for Northbound APIs; (Release 16)", 3GPP TS 29.122 V16.7.0, Sep. 2020, 361 pages.

"3rd Generation Partnership Project; Technical Specification Group Services and System Aspects; Policy and charging control framework for the 5G System (5GS); Stage 2 (Release 16)", 3GPP TS 23.503 V16.6.0, Sep. 2020, 118 pages.

"3rd Generation Partnership Project; Technical Specification Group Services and System Aspects; System architecture for the 5G System (5GS); Stage 2 (Release 16)", 23.501 V16.6.0, Sep. 2020, 447 pages.

"3rd Generation Partnership Project; Technical Specification Group Services and System Aspects; Telecommunication management; Charging management; 5G system, charging service; Stage 3 (Release 16)", 3GPP TS 32.291 V16.5.1, Sep. 2020, 128 pages.

"3rd Generation Partnership Project; Technical Specification Group Services and System Aspects; Telecommunication management; Subscriber and equipment trace; Trace control and configuration management (Release 17)", 3GPP TS 32.422 V17.0.0, Sep. 2020, 220 pages.

"Correction to FailureCode and SessionFailureCode", 3GPP TSG-CT WG3 Meeting #112-e, C3-205123, Ericsson, E-Meeting, Nov. 4-13, 2020, 35 pages.

"Extension of Policy Decision Failure handling", 3GPP TSG-CT WG3 Meeting #112-e, C3-205124, Ericsson, E-Meeting, Nov. 4-13, 2020, 48 pages.

"3rd Generation Partnership Project; Technical Specification Group Core Network and Terminals; 5G System; Session Management Policy Control Service; Stage 3 (Release 16)", 3GPP TS 29.512 V16.4.0, Mar. 2020, 186 pages.

"3rd Generation Partnership Project; Technical Specification Group Core Network and Terminals; 5G System; Session Management Policy Control Service; Stage 3 (Release 17)", 3GPP TS 29.512 V17.0.0, Sep. 2020, 200 pages.

"PCC Rule Error Handling", Change Request; 3GPP TSG CT Meeting #81; CP-182169 (revision of C3-185377); Gold Coast, Australia, Sep. 10-11, 2018, 28 pages.

"PCC Rule Error Handling", Change Request; 3GPP TSG-CT WG3 Meeting #98; C3-185064 (revision of C3-184571); West Palm Beach, U.S.A., Aug. 20-24, 2018, 28 pages.

"Update the overview of the Npcf_SMPolicyControl Service", Pseudo Cr; 3GPP TSG-CT WG3 Meeting #94; C3-180103; Gothenburg, Sweden, Jan. 22-26, 2018, 2 pages.

* cited by examiner

100

Determining, Based On A Policy Decision Provisioned By A Second Entity, That An Error In At Least One Of:
Reference Of A Session Rule And/or A PCC Rule To The Policy Decision, Or An Attribute In The Policy Decision

S101

Transmitting, To The Second Entity, A Notification Of The Error

S103

200

Receiving, From A First Entity, A Notification
Of An Error In At Least One Of:
Reference Of A Session Rule And/or A PCC
Rule To A Policy Decision,
Or
An Attribute In A Policy Decision

S201

Updating The Policy Decision

S203

First Entity <u>400</u>

First Entity <u>500</u>

Second Entity <u>600</u>

Second Entity <u>700</u>

METHODS, ENTITIES, AND COMPUTER READABLE MEDIA FOR ERROR HANDLING

TECHNICAL FIELD

The present disclosure generally relates to the technical field of communication technologies, and particularly to methods, entities, and computer readable media for error handling.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

3GPP TS 29.512 v17.0.0 (which is incorporated herein as a whole by reference) has several chapters for an error report to Policy Control Function (PCF), in which Chapter 4.2.3.16 describes a Policy and Charging Control (PCC) rule error report for Npcf_SMPolicyControl_UpdateNotify Service Operation;

Chapter 4.2.3.20 describes a Session Rule Error Report for Npcf_SMPolicyControl_UpdateNotify Service Operation;

Chapter 4.2.3.26 describes Policy decision and condition data error handling for Npcf_SMPolicyControl_UpdateNotify Service Operation;

Chapter 4.2.4.15 describes PCC rule error report for Npcf_SMPolicyControl_Update and Npcf_SMPolicyControl_Create Service Operation;

Chapter 4.2.4.21 describes a Session Rule Error Report for Npcf_SMPolicyControl_Update and Npcf_SMPolicyControl_Create Service Operation.

Chapter 4.2.4.26 describes Policy decision and condition data error handling for Npcf_SMPolicyControl_Update and Npcf_SMPolicyControl_Create Service Operation.

These chapters describes the error happens in rule or policy decision. However, since the policy decision and condition data are referred by rule, the reference may be wrongly provisioned or updated by the PCF. Or, the error may happen in attributes in SmPolicyDecision other than sessRules, pccRules, gosDecs, chgDecs, traffContDecs, umDecs, gosMonDecs and conds, such as the attributes reflectiveQoSTimer, policyCtrlReqTriggers, lastReqUsageData, praInfos etc.

The current 3GPP specifications don't have the option for the Session Management Function (SMF) to report the policy decision and condition data with session rule/PCC rule reference error and error in attributes in SmPolicyDecision other than sessRules, pccRules, gosDecs, chgDecs, traffContDecs, umDecs, gosMonDecs and conds.

There are generally three types of error cases:

Case 1: Session rule and/or PCC rule refer to one or more empty policy decisions and/or condition data, e.g., a dynamic PCC rule with refUmData pointing to non-exist umData;

Case 2: SM policy decision and session rule/PCC rule are provisioned with inconsistency, e.g., UsageMonitoringData instance is referred by both session rule and PCC rule.

Case 3: an error in attributes in SmPolicyDecision other than sessRules, pccRules, gosDecs, chgDecs, traffContDecs, umDecs, gosMonDecs and conds, such as reflectiveQoSTimer, policyCtrlReqTriggers, lastReqUsageData, praInfos etc. in Table 5.6.2.4-1 of 3GPP TS 29.512 v17.0.0, which is excerpted below as Table 1. For example, an error in praInfos may be praInfos validation/enforcement error, an error in policyCtrlReqTriggers may be e.g., the PCF removing the "US_RE" policy control request trigger while usage monitoring is still active in the SMF.

TABLE 1

Definition of type SmPolicyDecision

| Attribute name | Data type | P | Cardinality | Description | Applicability |
|---|---|---|---|---|---|
| sessRules | map(SessionRule) | O | 1 ... N | A map of Sessionrules with the content being the SessionRule as described in subclause 5.6.2.7. The key used in this map for each entry is the sessRuleId attribute of the corresponding SessionRule. (NOTE 2) | |
| pccRules | map(PccRule) | O | 1 ... N | A map of PCC rules with the content being the PCCRule as described in subclause 5.6.2.6. The key used in this map for each entry is the pccRuleId attribute of the corresponding PccRule. | |
| qosDecs | map(QosData) | O | 1 ... N | Map of QoS data policy decisions. The key used in this map for each entry is the qosId attribute of the corresponding QosData. (NOTE 2) | |
| chgDecs | map(ChargingData) | O | 1 ... N | Map of Charging data policy decisions. The key used in this map for each entry is the chgId attribute of the corresponding ChargingData. | |
| chargingInfo | ChargingInformation | C | 1 | Contains the CHF addresses and possible associated CHF instance Ids and CHF set IDs of the PDU session. (NOTE 3) | |

TABLE 1-continued

Definition of type SmPolicyDecision

| Attribute name | Data type | P | Cardinality | Description | Applicability |
|---|---|---|---|---|---|
| traffContDecs | map(TrafficControlData) | O | 1 . . . N | Map of Traffic Control data policy decisions. The key used in this map for each entry is the tcId attribute of the corresponding TrafficControlData. (NOTE 2) | |
| umDecs | map(UsageMonitoringData) | O | 1 . . . N | Map of Usage Monitoring data policy decisions. The key used in this map for each entry is the umId attribute of the corresponding UsageMonitoringData. | |
| qosChars | map(QosCharacteristics) | O | 1 . . . N | Map of QoS characteristics for non-standard 5QIs and non-preconfigured 5QIs. This map uses the 5QI values as keys. (NOTE 2) | |
| qosMonDecs | map(QosMonitoringData) | O | 1 . . . N | Map of QoS Monitoring data policy decision. The key used in this map for each entry is the qmId attribute of the corresponding QosMonitoringData. | QoSMonitoring |
| reflectiveQoSTimer | DurationSec | O | 0 . . . 1 | Defines the lifetime of a UE derived QoS rule belonging to the PDU Session for reflective QoS. (NOTE 2) | |
| offline | boolean | O | 0 . . . 1 | Indicates the offline charging is applicable to the PDU session when it is included and set to true. (NOTE 3) (NOTE 4) | |
| online | boolean | O | 0 . . . 1 | Indicates the online charging is applicable to the PDU session when it is included and set to true. (NOTE 3) (NOTE 4) | |
| conds | map(ConditionData) | O | 1 . . . N | A map of condition data with the content being as described in subclause 5.6.2.9. The key used in this map for each entry is the condId attribute of the corresponding ConditionData. | |
| revalidation Time | Date Time | O | 0 . . . 1 | Defines the time before which the SMF shall have to re-request PCC rules. | |
| pcscfRestIndication | boolean | O | 0 . . . 1 | If this attribute is included and set to true, it indicates that the P-CSCF Restoration is requested. The default value "FALSE" applies, if the attribute is not present and has not been supplied previously. | PCSCF-Restoration-Enhancement |
| policyCtrlReqTriggers | array(PolicyControlRequestTrigger) | O | 1 . . . N | Defines the policy control request triggers subscribed by the PCF. | |
| lastReqRuleData | array(RequestedRuleData) | O | 1 . . . N | Defines the last list of rule control data requested by the PCF. | |
| lastReqUsageData | RequestedUsageData | O | 0 . . . 1 | Defines the last requested usage data by the PCF. | |
| praInfos | map(PresenceInfoRm) | O | 1 . . . N | Defines the PRA information provisioned by the PCF. The "praId" attribute within the PresenceInfo data type shall also be the key of the map. The "presenceState" attribute within the PresenceInfo data type shall not be supplied. | PRA |
| ipv4Index | IpIndex | C | 0 . . . 1 | Information that identifies the IP address allocation method for IPv4 address allocation. (NOTE 3) | |
| ipv6Index | IpIndex | C | 0 . . . 1 | Information that identifies the IP address allocation method for IPv6 address allocation. (NOTE 3) | |
| qosFlowUsage | QosFlowUsage | O | 0 . . . 1 | Indicates the required usage for default QoS flow. | |
| relCause | SmPolicyAssociation ReleaseCause | O | 0 . . . 1 | The cause for which the PCF requests the termination of the policy association. | RespBasedSessionRel |
| suppFeat | SupportedFeatures | C | 0 . . . 1 | Indicates the list of negotiated supported features. This parameter shall be supplied by the PCF in the response to the | |

TABLE 1-continued

Definition of type SmPolicyDecision

| Attribute name | Data type | P | Cardinality | Description | Applicability |
|---|---|---|---|---|---|
| | | | | POST request that requested the creation of an individual SM policy resource. | |
| tsnBridgeManCont | BridgeManagementContainer | O | 0 . . . 1 | Transports TSN bridge management information | TimeSensitiveNetworking |
| tsnPortManContDstt | PortManagementContainer | O | 0 . . . 1 | Transports TSN port management information for the DS-TT port. | TimeSensitiveNetworking |
| tsnPortManContNwtts | array(PortManagementContainer) | O | 1 . . . N | Transports TSN port management information for one or more NW-TT ports. | TimeSensitiveNetworking |

NOTE 1:
For IPV4v6 PDU session, both the "ipv4Index" attribute and "ipv6Index" attribute may be provisioned by the PCF.
NOTE 2:
This attribute shall not be removed if it was provisioned.
NOTE 3:
This attribute may only be supplied by the PCF in the response to the POST request that requested the creation of an individual SM policy resource.
NOTE 4:
If both the "offline" attribute and the "online" attribute is omitted by the PCF, the default charging method pre-configured at the SMF if available shall be applied to the PDU session. If both offline and online charging methods are pre-configured at the SMF, the SMF shalldetermine either of them to be applied to the PDU session based on local policy. The "offline"attribute and the "online" attribute shall not be simultaneously present with the same value,i.e., both set to true or both set to false.
NOTE 5:
If the "chargingInfo" attribute is not supplied by the PCF, the charging information configured at the SMF shall be applied to the PDU session.

When such an error happens, there is no description about how to handle it.

For case 1 and case 2, currently, if the error information is provisioned from a UpdateNotify message (e.g., the Npcf_SMPolicyControl_UpdateNotify Request message), the SMF may reject the message with error status code. If the error applies to one or more PCC/session rule, it may also be with a rule error report. However, there is no appropriate FailureCode/SessionRuleFailureCode with current specification. Using incorrect failure code may lead to wrong decision on the PCF for the existing session; and For case 1 and case 2, if the error information is provisioned from a Create/Update Response message (e.g., the Npcf_SMPolicyControl_Create/UpdateResponse message), there is no mechanism to report the error back to the PCF. The SMF may ignore the error which leads to unspecified behaviors and inconsistent interactions between the SMF and the PCF. The SMF may terminate user session, which leads bad end user experience;

For case 3, if the error happens in attributes in SmPolicyDecision other than sessRules, pccRules, gosDecs, chgDecs, traffContDecs, umDecs, gosMonDecs and conds, e.g., praInfos validation/enforcement error, or the PCF removing the "US_RE" policy control request trigger while usage monitoring is still active in the SMF, the current 3GPP specifications don't have the option for the SMF to report such errors.

In view of the foregoing, in the current 3GPP specifications, if the error information is provisioned from the UpdateNotify message (e.g., the Npcf_SMPolicyControl_UpdateNotify Request message), the SMF may reject the message with error status code; and if the error information is provisioned from the Create/Update Response message (e.g., the Npcf_SMPolicyControl_Create/UpdateResponse message), there is no mechanism for the SMF to report the error to the PCF. In addition, if the error happens in attributes in SmPolicyDecision other than sessRules, pccRules, gosDecs, chgDecs, traffContDecs, umDecs, gosMonDecs and conds, e.g., praInfos validation/enforcement error, policyC-trlReqTriggers, there is also no mechanism for the SMF to report the error.

Therefore, an effective error handling mechanism is thus desired.

SUMMARY

In order to achieve at least the above purpose, the present disclosure introduces an option for the SMF to notify the PCF about:

1) error in reference of a session rule and/or a PCC rule to the policy decision, which includes at least one of: the session rule and/or the PCC rule referring to an empty policy decision, or inconsistency of the policy decision with the session rule and/or the PCC rule, which includes at least one of: inconsistency of the policy decision that is provisioned by the second entity with both the session rule and the PCC rule in the same policy decision, or inconsistency of the policy decision that is provisioned by the second entity with both a session rule and a PCC rule in an updated policy decision; or 2) error in an attribute in at least one attribute in SmPolicyDecision other than sessRules, pccRules, gosDecs, chgDecs, traffContDecs, umDecs, gosMonDecs and conds, such as reflectiveQoSTimer, policyCtrlReqTriggers, lastReqUsageData, praInfos etc.

According to a first aspect of the present disclosure, a method at a first entity is provided. The method includes: determining, based on a policy decision provisioned by a second entity, that an error in at least one of: reference of a session rule and/or a Policy and Charging Control, PCC, rule to the policy decision, or an attribute in the policy decision; and transmitting, to the second entity, a notification of the error.

In an exemplary embodiment, the method further includes: receiving, from the second entity, an updated policy decision.

In an exemplary embodiment, the error in reference of the session rule and/or the PCC rule to the policy decision further includes at least one of: the session rule and/or the PCC rule referring to an empty policy decision, or inconsistency of the policy decision with the session rule and/or the PCC rule.

In an exemplary embodiment, the inconsistency of the policy decision with the session rule and the PCC rule further includes at least one of: inconsistency of the policy decision that is provisioned by the second entity with both the session rule and the PCC rule in the same policy decision, or inconsistency of the policy decision that is provisioned by the second entity with both a session rule and a PCC rule in an updated policy decision.

In an exemplary embodiment, the notification of the error is carried in a first request message for policy control update.

In an exemplary embodiment, the updated policy decision is carried in a first response message corresponding to the first request message for policy control update.

In an exemplary embodiment, the method further includes: transmitting, to the second entity, a second request message for policy control create/update; and receiving, from the second entity, a second response message corresponding to the second request message for policy control create/update, which includes the policy decision provisioned by the second entity.

In an exemplary embodiment, the notification of the error is carried in a first response message for policy control update notification.

In an exemplary embodiment, the method further includes: receiving, from the second entity, a first request message corresponding to the first response message for policy control update notification, which includes the policy decision provisioned by the second entity.

In an exemplary embodiment, the updated policy decision is carried in a second request message for policy control update notification.

In an exemplary embodiment, the first entity is an SMF, entity, and the second entity is a PCF entity.

In an exemplary embodiment, the policy decision includes a Session Management (SM) policy decision represented by SmPolicyDecision.

In an exemplary embodiment, the error in the attribute in the policy decision includes an error in at least one attribute in SmPolicyDecision other than sessRules, pccRules, gosDecs, chgDecs, traffContDecs, umDecs, gosMonDecs and conds.

According to a second aspect of the present disclosure, a method at a second entity is provided. The method includes: receiving, from a first entity, a notification of an error in at least one of: reference of a session rule and/or a PCC rule to a policy decision, or an attribute in a policy decision; and updating the policy decision.

In an exemplary embodiment, the method further includes: transmitting, to the first entity, the updated policy decision.

In an exemplary embodiment, the error in reference of the session rule and/or the PCC rule to the policy decision further includes at least one of: the session rule and/or the PCC rule referring to an empty policy decision, or inconsistency of the policy decision with the session rule and/or the PCC rule.

In an exemplary embodiment, the inconsistency of the policy decision with the session rule and the PCC rule further includes at least one of: inconsistency of the policy decision that is provisioned by the second entity with both the session rule and the PCC rule in the same policy decision, or inconsistency of the policy decision that is provisioned by the second entity with both a session rule and a PCC rule in an updated policy decision.

In an exemplary embodiment, the notification of the error is carried in a first request message for policy control update.

In an exemplary embodiment, the updated policy decision is carried in a first response message corresponding to the first request message for policy control update.

In an exemplary embodiment, the method further includes: receiving, from the first entity, a second request message for policy control create/update; and transmitting, to the first entity, a second response message corresponding to the second request message for policy control create/update, which includes the Policy decision provisioned by the second entity.

In an exemplary embodiment, the notification of the error is carried in a first response message for policy control update notification.

In an exemplary embodiment, the method further includes: transmitting, to the first entity, a first request message corresponding to the first response message for policy control update notification, which includes the policy decision provisioned by the second entity.

In an exemplary embodiment, the updated policy decision is carried in a second request message for policy control update notification.

In an exemplary embodiment, the first entity is an SMF entity, and the second entity is a PCF entity.

In an exemplary embodiment, the policy decision includes an SM policy decision represented by SmPolicyDecision.

In an exemplary embodiment, the error in the attribute in the policy decision includes an error in at least one attribute in SmPolicyDecision other than sessRules, pccRules, gosDecs, chgDecs, traffContDecs, umDecs, gosMonDecs and conds.

According to a third aspect of the present disclosure, a first entity is provided. The first entity includes: at least one processor, and at least one memory, storing instructions which, when executed on the at least one processor, cause the first entity to perform any of the methods according to the first aspect of the present disclosure.

According to a fourth aspect of the present disclosure, a second entity is provided. The second entity includes: at least one processor, and at least one memory, storing instructions which, when executed on the at least one processor, cause the second entity to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

According to the above technical solutions of the present disclosure, for the scenarios when the policy decision with session rule/PCC rule reference error happens; or the error in at least one attribute in SmPolicyDecision other than sessRules, pccRules, qosDecs, chgDecs, traffContDecs, umDecs, qosMonDecs and conds happens, e.g., the Presence Reporting Area (PRA) information validation/enforcement error happens, the SMF may notify the PCF about the error for the PCF decision of updating the provision according to valid information. Otherwise, the SMF may ignore the error which may cause the information inconsistency between the SMF and the PCF, or the SMF may terminate the PDU session which may lower the user experience.

BRIEF DESCRIPTION OF THE DRAWINGS

The objects, advantages and characteristics of the present disclosure will be more apparent, according to descriptions of preferred embodiments in connection with the drawings, in which.

Figure 1:
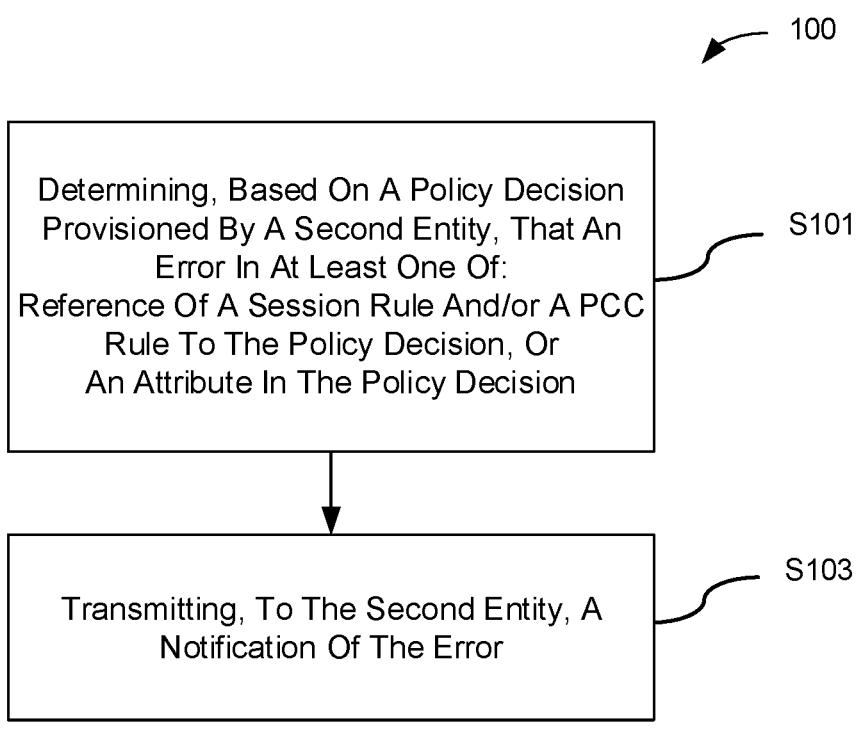
FIG. 1 schematically shows a method at a first entity for error handling according to an exemplary embodiment of the present disclosure.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein; the disclosed subject matter should not be construed as limited to only the embodiments set forth herein; rather, these embodiments are provided by way of example to convey the scope of the subject matter to those skilled in the art.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may comprise the first generation (1G), 2G, 3G, 4G, 4.5G, 5G communication protocols, and/or any other protocols either currently known or to be developed in the future.

The term "entity" or "network entity" used herein refers to a network device or network node or network function in a communication network, and may also refer to a virtualized entity that may be implemented on cloud. For example, in a wireless communication network such as a 3GPP-type cellular network, a core network device may offer numerous services to customers who are interconnected by an access network device. Each access network device is connectable to the core network device over a wired or wireless connection.

The basic ideas of the present disclosure mainly consist in that an NRF may obtain aggregated routing related information according to registration of domain information and/or update of the registration from SCPs to the NRF and possibly, other NRF(s); and an SCP requesting routing path discovery may retrieve the aggregated routing related information from the NRF, and subscribe to the NRF for change of the aggregated routing related information. Therefore, a routing path may be found by the SCP based on the retrieved aggregated routing related information without the need of finding the interconnected SCP domain(s) and the intermediate SCP(s) from the NRF hop by hop.

Hereinafter, a method 100 at a first entity for error handling according to an exemplary embodiment of the present disclosure will be described with reference to FIG. 1.

In an exemplary embodiment, the first entity may be an SMF entity, also called SMF for simplicity, and the second entity may be a PCF entity also called PCF for simplicity. However, it should be understood that the first entity may be any node that can be configured to perform the method 100 as described below, including a virtualized entity that may be implemented on cloud. It should also be understood that the method 100 may be appropriately applied in 5GS, or other future developments.

In step S101, the first entity may determine, based on a policy decision provisioned by a second entity, that an error in at least one of: reference of a session rule and/or a PCC rule to the policy decision, or an attribute in the policy decision.

In an exemplary embodiment, the inconsistency of the policy decision with the session rule and the PCC rule may include at least one of: inconsistency of the policy decision that is provisioned by the second entity with both the session rule and the PCC rule in the same policy decision, or inconsistency of the policy decision that is provisioned by the second entity with both a session rule and a PCC rule in an updated policy decision.

In an exemplary embodiment, the policy decision may include an SM policy decision represented by SmPolicyDecision.

Preferably, the error in the attribute in the policy decision may include an error in at least one attribute in SmPolicyDecision other than sessRules, pccRules, qosDecs, chgDecs, traffContDecs, umDecs, qosMonDecs and conds, such as the attribute reflectiveQoSTimer, policyCtrlReqTriggers, lastReqUsageData, praInfos etc. For example, an error in praInfos may be praInfos validation/enforcement error, an error in policyCtrlReqTriggers may be e.g., the PCF removing the "US_RE" policy control request trigger while usage monitoring is still active in the SMF.

In Step S103, the first entity may transmit, to the second entity, a notification of the error.

In an exemplary embodiment, the notification of the error may be carried in a first request message for policy control update, e.g., Npcf_SMPolicyControl_Update Request message including ruleReports/sessRuleReports/policyDecFailureReports.

In an exemplary embodiment, regarding the policy decision with session rule/PCC rule reference error, the FailureCode for PCC rule error report may be extended:

In Chapter 5.6.3.9 of 3GPP TS 29.512 v17.0.0, Data Types in Table 5.6.3.9-1 (shown as Table 2 below): Enumeration FailureCode may be added.

TABLE 2

| Enumeration value | Description | Applicability |
|---|---|---|
| UNKNOWN_REF_ID | Indicates that the dynamic PCC rule could not be successfully provisioned because the reference identifier to a Policy Decision Data or to a Condition Data is unknown to the SMF. | |
| INCORRECT_REF_DATA | Indicates that the dynamic PCC rule could not be successfully provisioned because the referred Policy Decision or Condition data are incorrect (e.g. "activationTime" attribute value in a ConditionData instance indicates a time value that occurs after the "deactivation Time" attribute indicated time value.) | |
| REF_ID_COLLISION | Indicates that the dynamic PCC rule could not be successfully provisioned because the same Policy Decision is referred by a session rule. | |

In an exemplary embodiment, the error in reference of the session rule and/or the PCC rule to the policy decision may include at least one of: the session rule and/or the PCC rule referring to an empty policy decision, or inconsistency of the policy decision with the session rule and/or the PCC rule.

In an exemplary embodiment, regarding the policy decision with session rule reference error, the SessionRuleFailureCode for session rule error report may be extended:

In Chapter 5.6.3.17 of 3GPP TS 29.512 v17.0.0, data types in Table 5.6.3.17-1 (shown as Table 3 below): Enumeration SessionRuleFailureCode may be added.

TABLE 3

| Enumeration value | Description | Applicability |
|---|---|---|
| UNKNOWN_REF_ID | Indicates that the session rule could not be successfully provisioned because the reference identifier to a Policy Decision Data or to a Condition Data is unknown to the SMF. | |

TABLE 3-continued

| Enumeration value | Description | Applicability |
|---|---|---|
| INCORRECT_REF_DATA | Indicates that the session rule could not be successfully provisioned because the re-ferred Policy Decision or Condition data are incorrect (e.g. "activationTime" attri-bute value in a ConditionData instance indicates a time value that occurs after the "deactivationTime" attribute indi-cated time value.). | |
| REF_ID_COLLISION | Indicates that the session rule could not be successfully provisioned because the same Policy Decision is referred by a PCC rule. | |

In an exemplary embodiment, regarding e.g., the praInfos and policyCtrlReqTriggers error, the PolicyDecisionFailure-Code for PolicyDecisionErrorHandling may be extended.

In Chapter Table 5.6.2.19-1, and Table 5.6.2.33-1 (shown as Table 4 below), the following may be added:

TABLE 4

| Attribute name | Data type | P | Cardinality | Description | Applicability |
|---|---|---|---|---|---|
| invalidPolicyDecs | array (InvalidParam) | O | 1 . . . N | Indicates the invalid parameters for the reported type(s) of the failed policy decision and/or condition data. | ExtPolicyDecision-ErrorHandling |

In Chapter 5.6.3.28 of 3GPP TS 29.512 v17.0.0, data types in Table 5.6.3.28-1 (shown as Table 5 below): Poli-cyDecisionFailureCode may be added.

TABLE 5

| Enumeration value | Description | Applic-ability |
|---|---|---|
| POLICY_PARAM_ERR | Indicates the information related to the provisioned policy parameter(s) is incorrect, incomplete or inconsis-tent. | |

After the second entity receives the notification of the error, the second entity updates the policy decision, and transmits the updated policy decision to the first entity.

Thus, the method 100 further includes: the first entity receiving, from the second entity, the updated policy deci-sion.

In an exemplary embodiment, the updated policy decision is carried in a first response message corresponding to the first request message for policy control update, e.g., an Npcf_SMPolicyControl_Update Response message.

In an exemplary embodiment, the method may further include: the first entity transmitting, to the second entity, a second request message for policy control create/update, e.g., an Npcf_SMPolicyControl_Create/Update Request message; and receiving, from the second entity, a second response message corresponding to the second request mes-sage for policy control create/update, which comprises the policy decision provisioned by the second entity, e.g., an Npcf_SMPolicyControl_Create/Update Response message.

In another exemplary embodiment, the notification of the error may be carried in a first response message for policy control update notification, e.g., an Npcf_SMPolicyContro-l_UpdateNotify Response message including ruleReports/sessRuleReports/policyDecFailureReports.

In this exemplary embodiment, the method 100 may further include: receiving, from the second entity, a first request message corresponding to the first response message for policy control update notification, e.g., an Npcf_SM-PolicyControl_UpdateNotify Request message which com-prises the policy decision provisioned by the second entity.

In this exemplary embodiment, the updated policy deci-sion is carried in a second request message for policy control update notification, e.g., an Npcf_SMPolicyControl_Updat-eNotify Response message.

The first entity may be an SMF entity, and the second entity may be a PCF entity.

Figure 2:
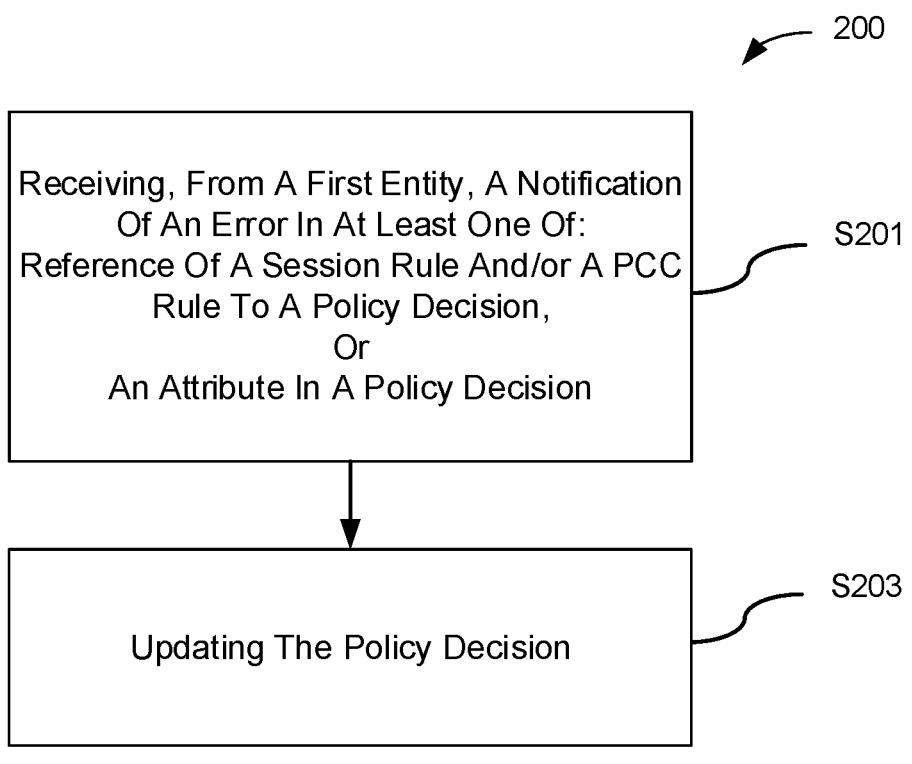
FIG. 2 schematically shows a method at a second entity for error handling according to an exemplary embodiment of the present disclosure.

Hereinafter, a method 200 at a second entity for error handling according to an exemplary embodiment of the present disclosure will be described with reference to FIG. 2. It should be understood that the method 200 at the second entity is corresponding to the method 100 at the first entity. Thus, some description thereof may refer to those of the method 100 and will be omitted for simplicity.

In an exemplary embodiment, the first entity may be an SMF entity, also called SMF for simplicity, and the second entity may be a PCF entity also called PCF for simplicity. However, it should be understood that the second entity may be any node that can be configured to perform the method 200 as described below, including a virtualized entity that may be implemented on cloud. It should also be understood that the method 200 may be appropriately applied in 5GS, or other future developments.

In step S201, the second entity may receive, from the first entity, a notification of an error in at least one of: reference of a session rule and/or a PCC rule to the policy decision, or an attribute in the policy decision.

In an exemplary embodiment, the notification of the error may be carried in a first request message for policy control update, e.g., Npcf_SMPolicyControl_Update Request mes-sage including ruleReports/sessRuleReports/policyDecFail-ureReports.

In step S203, the second entity may update the policy decision based on the received notification of the error.

The method further include: the second entity transmit-ting, to the first entity, the updated policy decision.

In an exemplary embodiment, the updated policy decision is carried in a first response message corresponding to the first request message for policy control update, e.g., an Npcf_SMPolicyControl_Update Response message.

In an exemplary embodiment, the method 200 may further include: the second entity receiving, from the first entity, a second request message for policy control create/update, e.g., an Npcf_SMPolicyControl_Create/Update Request message; and transmitting, to the first entity, a second response message corresponding to the second request message for policy control create/update, which comprises the policy decision provisioned by the second entity, e.g., an Npcf_SMPolicyControl_Create/Update Response message.

In another exemplary embodiment, the notification of the error may be carried in a first response message for policy control update notification, e.g., an Npcf_SMPolicyContro-l_UpdateNotify Response message including ruleReports/sessRuleReports/policyDecFailureReports.

In this exemplary embodiment, the method 200 may further include: transmitting, to the first entity, a first request message corresponding to the first response message for policy control update notification, e.g., an Npcf_SMPolicy-Control_UpdateNotify Request message which comprises the policy decision provisioned by the second entity.

In this exemplary embodiment, the updated policy decision is carried in a second request message for policy control update notification, e.g., an Npcf_SMPolicyControl_Updat-eNotify Response message.

Hereinafter, an exemplary signaling sequence diagrams related to error handling according to an exemplary embodiment of the present disclosure will be described respectively with reference to FIGS. 3A and 3B, in which the method 100 at the first entity and the method 200 at the second entity for error handling according to exemplary embodiments of the present disclosure may be applied.

Figure 3A:
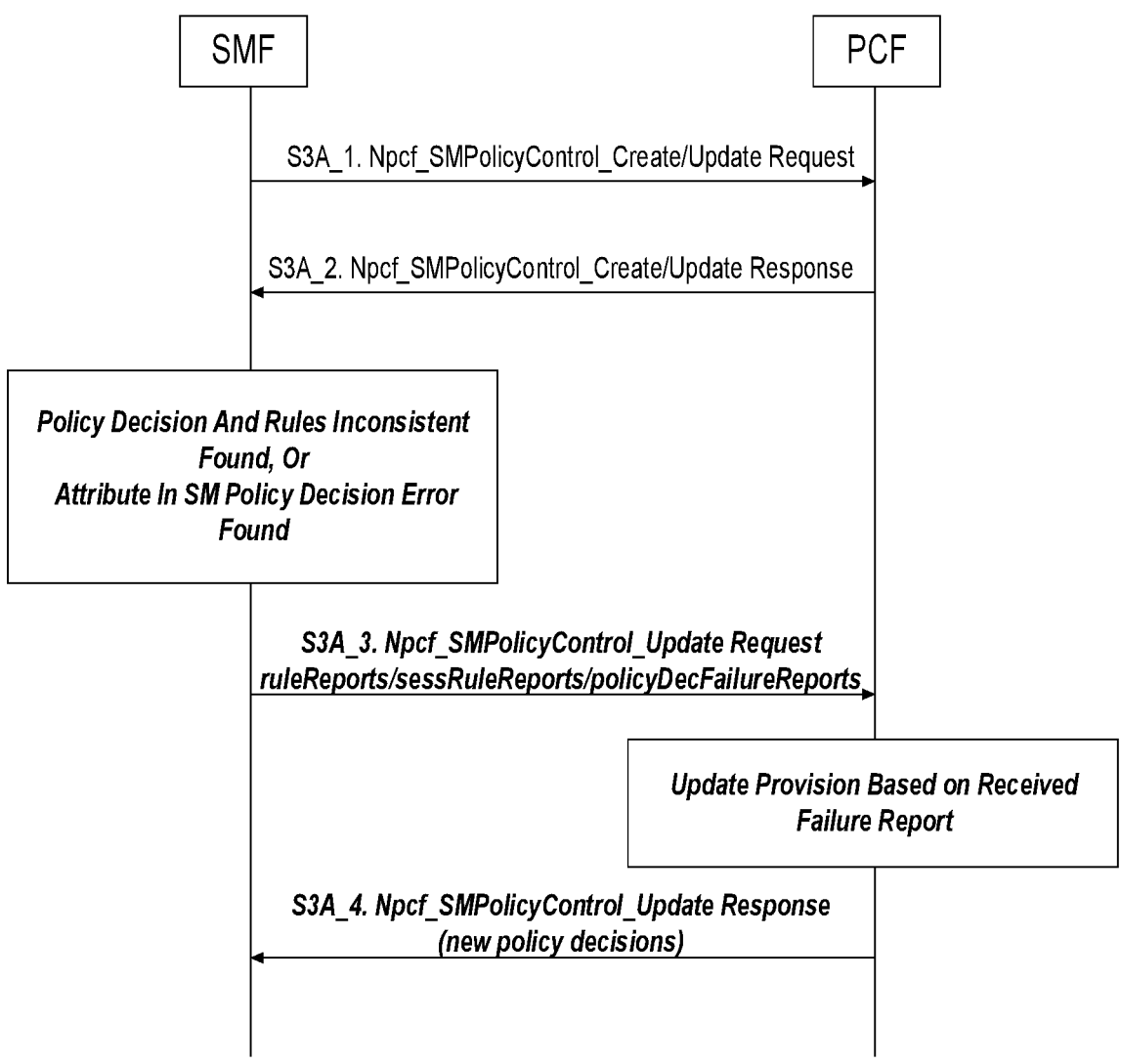
FIG. 3A and FIG. 3B schematically show exemplary signaling sequence diagrams of error handling in different scenarios according to an exemplary embodiment of the present disclosure.
Figure 3B:
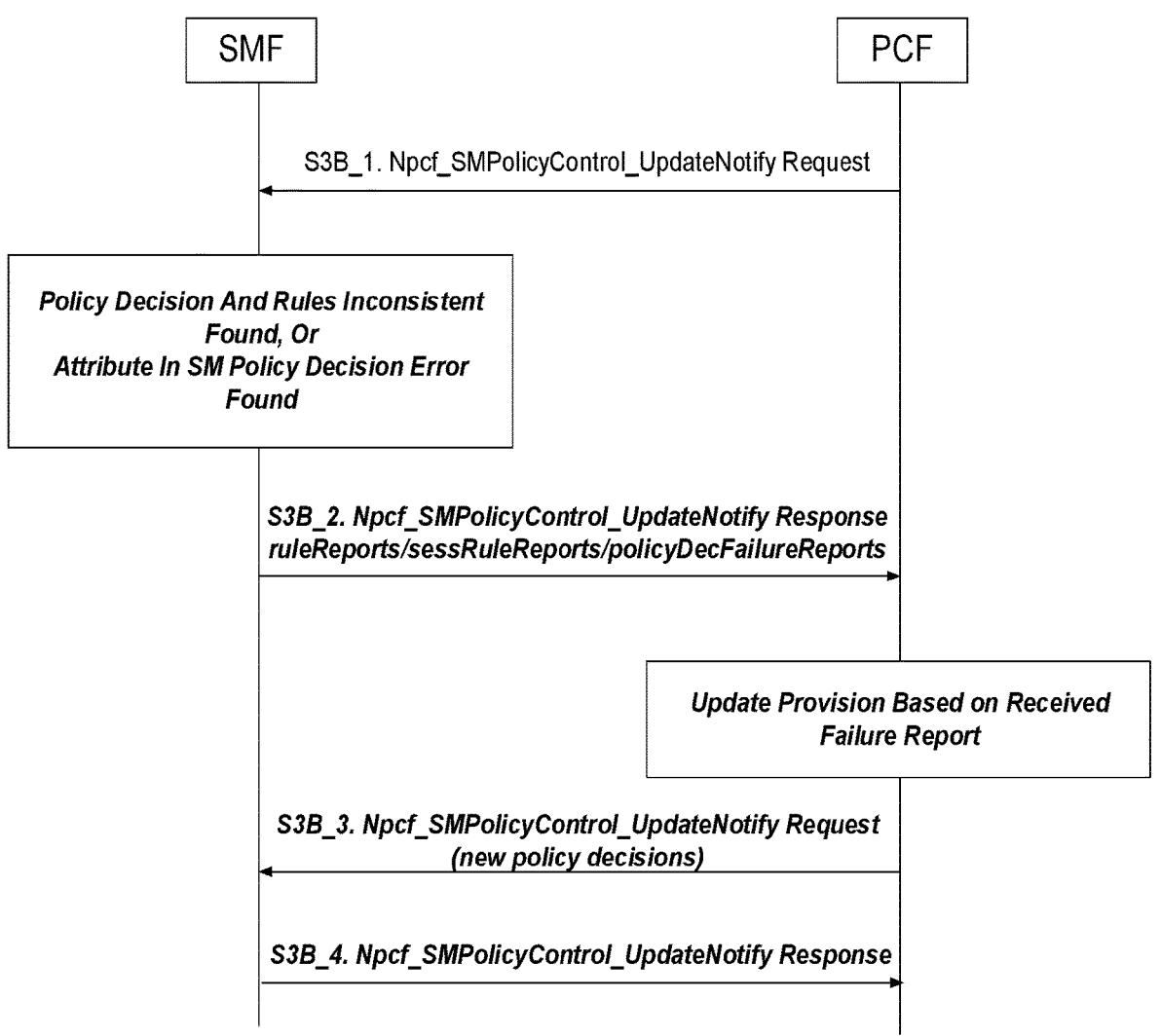

In the exemplary signaling sequence diagrams of FIGS. 3A and 3B, an SMF is shown as an example of the first entity, an PCF is shown as an example of the second entity.

It should be noted that the description below mainly focuses on signaling related to the methods 100 and 200, and some other signaling is not described in detail to avoid obscuring the principle of the present disclosure.

In the scenario of FIG. 3A, signaling shown in Italics is novel, wherein Signaling S3A_3-S3A_4 are involved.

In S3A_1, the SMF sends e.g., SmPolicyControl_Create/Update Request to the PCF;

In S3A_2, the PCF provisions, to the SMF, new policy decision and/or condition data, as well as session rules and PCC rules with reference to policy decision and/or condition data if applicable via e.g., SmPolicyControl_Create/Update Response;

The SMF validates the PCF provisioned SM policy decisions/condition data as well as session and PCC rules, and finds errors as described previously. That is, 1) error in reference of a session rule and/or a PCC rule to the policy decision, which includes at least one of: the session rule and/or the PCC rule referring to an empty policy decision, or inconsistency of the policy decision with the session rule and/or the PCC rule, which includes at least one of: inconsistency of the policy decision that is provisioned by the second entity with both the session rule and the PCC rule in the same policy decision, or inconsistency of the policy decision that is provisioned by the second entity with both a session rule and a PCC rule in an updated policy decision; or 2) error in an attribute in at least one attribute in SmPolicyDecision other than sessRules, pccRules, gosDecs, chgDecs, traffContDecs, umDecs, gosMonDecs and conds, such as reflectiveQoSTimer, policyCtrlReqTriggers, lastReqUsageData, praInfos etc.

Then, in S3A_3, the SMF reports the error to the PCF using e.g., SmPolicyControl_Update Request including error reports to indicate the error;

In S3A_4, the PCF provisions updated new decision to the SMF via e.g., SmPolicyControl_Update Response based on the report error.

In the scenario of FIG. 3B, signaling shown in Italics is novel, wherein Signaling S3B_2~S3B_4 are involved.

In S3B_1: the PCF provisions policy decision and/or condition data, as well as session rules and PCC rules with reference to policy decision and/or condition data using e.g., SmPolicyControl_UpdateNotify Request;

The SMF validates the PCF provisioned SM policy decisions/condition data as well as session and PCC rules.

Then, in S3B_2, the SMF reports the error to PCF using e.g., SmPolicyControl_UpdateNotify Response including error reports to indicate the error;

In S3B_3, the PCF provisions updated new decision to the SMF via e.g., SmPolicyControl_UpdateNotify Request based on the report error.

In S3B_4, the SMF responds with e.g., SmPolicyContro-l_UpdateNotify Response.

Figure 4:
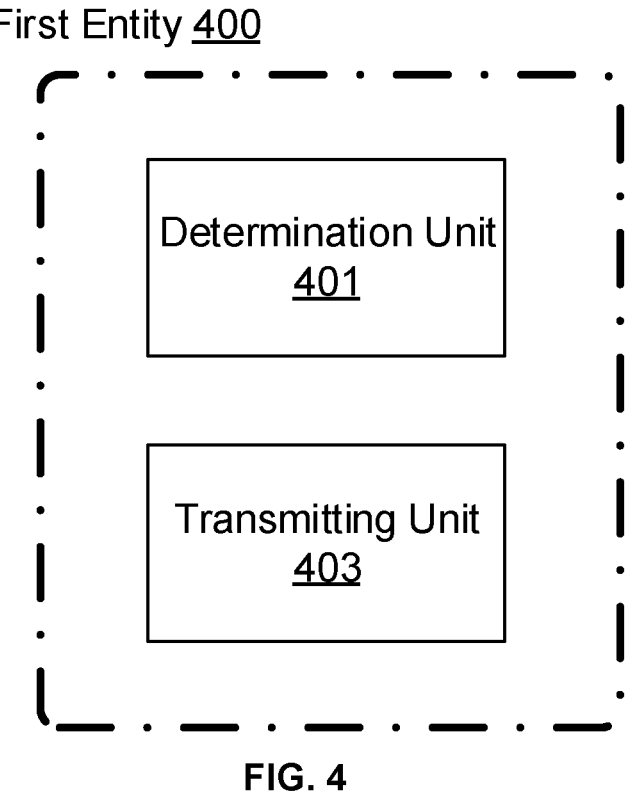
FIG. 4 schematically shows a structural block diagram of a first entity according to an exemplary embodiment of the present disclosure.

Hereinafter, a structure of a first entity according to an exemplary embodiment of the present disclosure will be described with reference to FIG. 4. FIG. 4 schematically shows a block diagram of a first entity 400 according to an exemplary embodiment of the present disclosure. The first entity 400 in FIG. 4 may perform the method 100 as described previously with reference to FIG. 1. Accordingly, some detailed description on the first entity 400 may refer to the corresponding description of the method 100 in FIG. 1 and the signaling sequence diagrams of FIGS. 3A and 3B as previously discussed, and thus will be omitted here for simplicity.

As shown in FIG. 4, the first entity 400 may include a determination unit 401 and a transmitting unit 403.

The determination unit 401 may determine, based on a policy decision provisioned by a second entity, that an error in at least one of: reference of a session rule and/or a PCC rule to the policy decision, or an attribute in the policy decision.

The transmitting unit 403 may transmit, to the second entity, a notification of the error.

In an exemplary embodiment, the first entity 400 may also include a receiving unit (not shown), which may be configured to receive, from the second entity, an updated policy decision.

In an exemplary embodiment, the transmitting unit 403 may be further configured to transmit, to the second entity, a second request message for policy control create/update.

In an exemplary embodiment, the receiving unit may be further configured to receive, from the second entity, a second response message corresponding to the second request message for policy control create/update, which comprises the policy decision provisioned by the second entity.

In an exemplary embodiment, the receiving unit may be further configured to receive, from the second entity, a first request message corresponding to the first response message for policy control update notification, which comprises the policy decision provisioned by the second entity.

Figure 5:
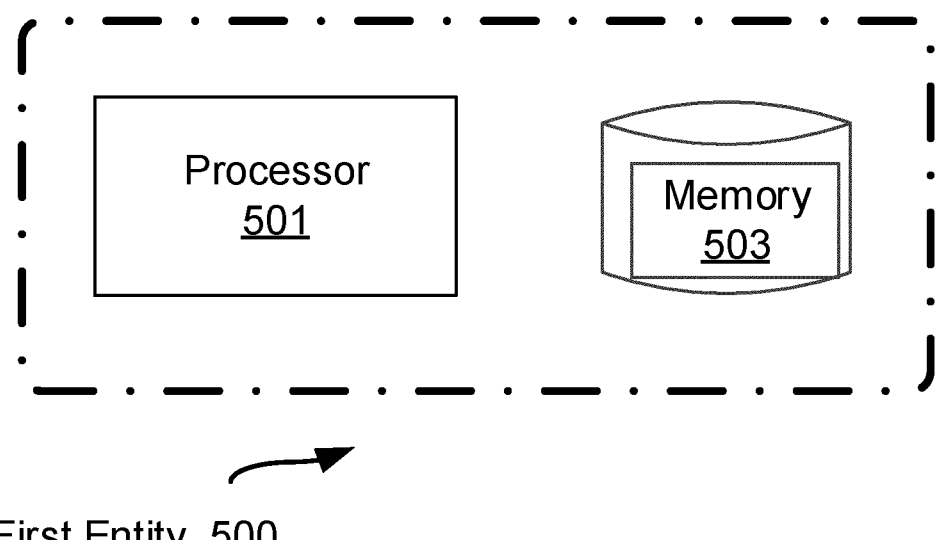
FIG. 5 schematically shows a structural block diagram of a first entity according to another exemplary embodiment of the present disclosure.

Hereinafter, a structure of a first entity according to another exemplary embodiment of the present disclosure will be described with reference to FIG. 5. FIG. 5 schematically shows a block diagram of a first entity 500 according to an exemplary embodiment of the present disclosure. The first entity 500 in FIG. 5 may perform the method 100 as described previously with reference to FIG. 1. Accordingly, some detailed description on the first entity 500 may refer to the corresponding description of the method 100 in FIG. 1 and the signaling sequence diagrams of FIGS. 3A and 3B as previously discussed, and thus will be omitted here for simplicity.

As shown in FIG. 5, the first entity 500 includes at least one processor 501 and at least one memory 503. The at least one processor 501 includes e.g., any suitable CPU (Central Processing Unit), microcontroller, DSP (Digital Signal Processor), etc., capable of executing computer program instructions. The at least one memory 503 may be any combination of a RAM (Random Access Memory) and a ROM (Read Only Memory). The at least one processor memory 503 may also include persistent storage, which, for example, can be any single one or combination of magnetic memory, optical memory, or solid state memory or even remotely mounted memory.

The at least one memory 503 stores instructions executable by the at least one processor 501. The instructions, when loaded from the at least one memory 503 and executed on the at least one processor 501, may cause the first entity 500 to perform the actions, e.g., of the procedures as described earlier respectively in conjunction with FIG. 1 with reference to the signaling sequence diagrams of FIGS. 3A and 3B as previously discussed, and thus will be omitted here for simplicity.

Figure 6:
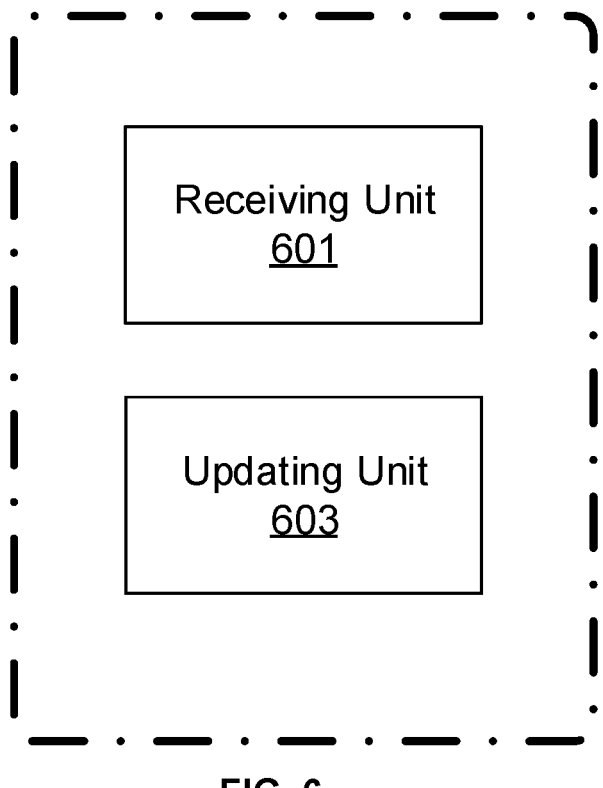
FIG. 6 schematically shows a structural block diagram of a second entity according to an exemplary embodiment of the present disclosure.

Hereinafter, a structure of a second entity according to an exemplary embodiment of the present disclosure will be described with reference to FIG. 6. FIG. 6 schematically shows a block diagram of a second entity 600 according to an exemplary embodiment of the present disclosure. The second entity 600 in FIG. 6 may perform the method 200 as described previously with reference to FIG. 2. Accordingly, some detailed description on the second entity 600 may refer to the corresponding description of the method 200 in FIG. 2 and the signaling sequence diagrams of FIGS. 3A and 3B as previously discussed, and thus will be omitted here for simplicity.

As shown in FIG. 6, the second entity 600 may include a receiving unit 601 and an updating unit 603.

The receiving unit 601 may receive, from a first entity, a notification of an error in at least one of: reference of a session rule and/or a Policy and Charging Control, PCC, rule to the policy decision, or an attribute in the policy decision.

The updating unit 603 may update the policy decision based on the received notification of the error.

In an exemplary embodiment, the second entity 600 may further include a transmitting unit, which may be configured to transmit, to the first entity, the updated policy decision.

In an exemplary embodiment, the receiving unit 601 may be further configured to receive, from the first entity, a second request message for policy control create/update, and the transmitting unit may be further configured to transmit, to the first entity, a second response message corresponding to the second request message for policy control create/update, which comprises the Policy decision provisioned by the second entity In an exemplary embodiment, the transmitting unit may be further configured to transmit, to the first entity, a first request message corresponding to the first response message for policy control update notification, which comprises the policy decision provisioned by the second entity.

Figure 7:
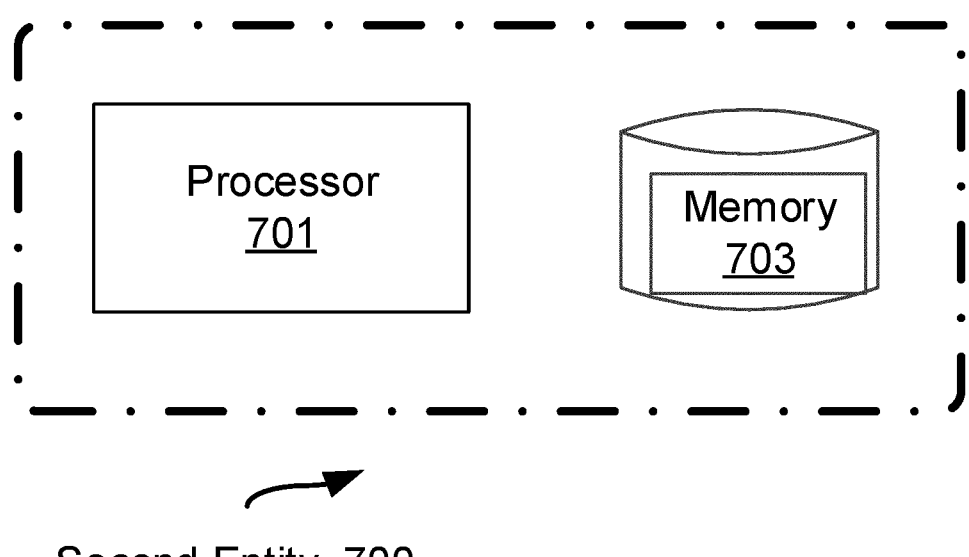
FIG. 7 schematically shows a structural block diagram of a second entity according to another exemplary embodiment of the present disclosure.

Hereinafter, a structure of a second entity according to another exemplary embodiment of the present disclosure will be described with reference to FIG. 7. FIG. 7 schematically shows a block diagram of a second entity 700 according to an exemplary embodiment of the present disclosure. The second entity 700 in FIG. 7 may perform the method 200 as described previously with reference to FIG. 2. Accordingly, some detailed description on the second entity 700 may refer to the corresponding description of the method 200 in FIG. 2 and the signaling sequence diagrams of FIGS. 3A and 3B as previously discussed, and thus will be omitted here for simplicity.

As shown in FIG. 7, the second entity 700 includes at least one processor 701 and at least one memory 703. The at least one processor 1101 includes e.g., any suitable CPU (Central Processing Unit), microcontroller, DSP (Digital Signal Processor), etc., capable of executing computer program instructions. The at least one memory 703 may be any combination of a RAM (Random Access Memory) and a ROM (Read Only Memory). The at least one processor memory 703 may also include persistent storage, which, for example, can be any single one or combination of magnetic memory, optical memory, or solid state memory or even remotely mounted memory.

The at least one memory 703 stores instructions executable by the at least one processor 701. The instructions, when loaded from the at least one memory 703 and executed on the at least one processor 1101, may cause the executing entity 700 to perform the actions, e.g., of the procedures as described earlier respectively in conjunction with FIG. 2 with reference to the signaling sequence diagrams of FIGS. 3A and 3B as previously discussed, and thus will be omitted here for simplicity.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 501 causes the first entity 500 to perform the actions, e.g., of the procedure described earlier in conjunction with FIG. 1; or code/computer readable instructions, which when executed by the at least one processor 701 causes the second entity 700 to perform the actions, e.g., of the procedures described earlier respectively in conjunction with FIG. 2.

The computer program product may be configured as a computer program code structured in computer program modules. The computer program modules could essentially perform the actions of the flow illustrated in any of FIGS. 1-3B.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The present disclosure further comprises the following embodiments based on the 3GPP TS 29.512 v17.0.0.

5.6.3.9 Enumeration: FailureCode

TABLE 5.6.3.9-1

| Enumeration FailureCode | | |
| --- | --- | --- |
| Enumeration value | Description | Applicability |
| UNK_RULE_ID | Indicates that the pre-provisioned PCC rule could not be successfully activated because the PCC rule identifier is unknown to the SMF. | |
| RA_GR_ERR | Indicates that the PCC rule could not be successfully installed or enforced because the Rating Group specified within the Charging Data policy decision which the PCC rule refers to is unknown or, invalid. | |
| SER_ID_ERR | Indicates that the PCC rule could not be successfully installed or enforced because the Service Identifier specified within the Charging Data policy decision which the PCC rule refers to is invalid, unknown, or not applicable to the service being charged. | |
| NF_MAL | Indicates that the PCC rule could not be successfully installed (for those provisioned from the PCF) or activated (for those pre-defined in SMF) or enforced (for those already successfully installed) due to SMF/UPF malfunction. | |
| RES_LIM | Indicates that the PCC rule could not be successfully installed (for those provisioned from PCF) or activated (for those pre-defined in SMF) or enforced (for those already successfully installed) due to a limitation of resources at the SMF/UPF. | |
| MAX_NR_QoS_FLOW | Indicates that the PCC rule could not be successfully installed (for those provisioned from PCF) or activated (for those pre-defined in SMF) or enforced (for those already successfully installed) due to the fact that the maximum number of QoS flows has been reached for the PDU session. | |
| MISS_FLOW_INFO | Indicates that the PCC rule could not be successfully installed or enforced because neither the "flowInfos" attribute nor "appId" attribute is specified within the "pccRule" attribute by the PCF during the first install request of the PCC rule. | |
| RES_ALLO_FAIL | Indicates that the PCC rule could not be successfully installed or maintained since the QoS flow establishment/modification failed, or the QoS flow was released. | |
| UNSUCC_QOS_VAL | This value is used to: indicate that the QoS validation has failed or, Indicate when Guaranteed Bandwidth > Max-Requested-Bandwidth. | |
| INCOR_FLOW_INFO | Indicates that the PCC rule could not be successfully installed or modified at the SMF because the provided flow information is not supported by the network (e.g. the provided IP address(es) or Ipv6 prefix(es) do not correspond to an IP version applicable for the PDU session). | |
| PS_TO_CS_HAN | Indicates that the PCC rule could not be maintained because of PS to CS handover. | |
| APP_ID_ERR | Indicates that the PCC rule could not be successfully installed or enforced because the Application Identifier is invalid, unknown, or not applicable to the application required for detection. | ADC |
| NO_QOS_FLOWBOUND | Indicates that there is no QoS flow which the SMF can bind the PCC rule(s) to. | |
| FILTER_RES | Indicates that the Flow Information within the "flowinfos" attribute cannot be handled by the SMF because any of the restrictions defined in subclause 5.4.2 of 3GPP TS 29.212 [23] was not met. | |
| MISS_REDI_SER_ADDR | Indicates that the PCC rule could not be successfully installed or enforced at the SMF because there is no valid Redirect Server Address within the Traffic Control Data policy decision which the PCC rule refers to, provided by the PCF, and no preconfigured redirection address for this PCC rule at the SMF/UPF. | ADC |
| CM_END_USER_SER_DENIED | Indicates that the charging system denied the service request due to service restrictions (e.g. terminate rating group) or limitations related to the end-user, for example the end-user's account could not cover the requested service. | |
| CM_CREDIT_CON_NOT_APP | Indicates that the charging system determined that the service can be granted to the end user but no further credit control is needed for the service (e.g. service is free of charge or is treated for offline charging). | |

TABLE 5.6.3.9-1-continued

| Enumeration FailureCode | | |
|---|---|---|
| Enumeration value | Description | Applicability |
| CM_AUTH_REJ | Indicates that the charging system denied the service request in order to terminate the service for which credit is requested. | |
| CM_USER_UNK | Indicates that the specified end user could not be found in the charging system. | |
| CM_RAT_FAILED | Indicates that the charging system cannot rate the service request due to insufficient rating input, incorrect AVP combination or due to an attribute or an attribute value that is not recognized or supported in the rating. | |
| UE_STA_SUSP | Indicates that the UE is in suspend state. Only applicable to the interworking scenario as defined in Annex B. | PolicyUpdateWhenUESuspends |
| UNKNOWN_REF_ID | Indicates that the dynamic PCC rule could not be successfully installed/modified because the referenced identifier to a Policy Decision Data or to a Condition Data is unknown to the SMF. | |
| INCORRECT_REF_DATA | Indicates that the dynamic PCC rule could not be successfully installed/modified because the referenced Policy Decision or Condition data are incorrect (e.g. "activation Time" attribute value in a ConditionData instance indicates a time value that occurs after the "deactivationTime" attribute indicated time value.) | |
| REF_ID_COLLISION | Indicates that the dynamic PCC rule could not be successfully installed/modified because the same Policy Decision is referenced by a session rule. | |

5.6.3.17 Enumeration: SessionRuleFailureCode

TABLE 5.6.3.17-1

| Enumeration SessionRuleFailureCode | | |
|---|---|---|
| Enumeration value | Description | Applicability |
| NF_MAL | Indicates that the session rule could not be successfully installed) or enforced (for those already successfully installed) due to SMF/UPF malfunction. | |
| RES_LIM | Indicates that the session rule could not be successfully installed or enforced (for those already successfully installed) due to a limitation of resources at the SMF/UPF. | |
| UNSUCC_QOS_VALUE_UE_STA_SUSP | Indicate that the QoS validation has failed. | |
| | Indicates that the UE is in suspend state. Only applicable to the interworking scenario as defined in Annex B. | PolicyUpdateWhenUESuspends |
| UNKNOWN_REF_ID | Indicates that the session rule could not be successfully installed/modified because the reference identifier to a Policy Decision Data or to a Condition Data is unknown to the SMF. | |
| INCORRECT_REF_DATA | Indicates that the session rule could not be successfully installed/modified because the referenced Policy Decision or Condition data are incorrect (e.g. "activationTime" attribute value in a ConditionData instance indicates a time value that occurs after the "deactivation Time" attribute indicated time value.). | |
| REF_ID_COLLISION | Indicates that the session rule could not be successfully installed/modified because the same Policy Decision is referenced by a PCC rule. | |

The invention claimed is:

1. A method at a first entity, the method comprising:

receiving a policy decision from a second entity, for management of a session by the first entity, the policy decision comprising policy decision data defining quality of service and charging policies for the session, and one or more rules defining how to apply the quality of service and charging policies to the session, wherein each rule uses identifiers for referencing into the policy decision data;

detecting one or more reference errors in the policy decision, each reference error being an erroneous or inconsistent reference into the policy decision data; and transmitting, to the second entity, a notification of the one or more reference errors;

wherein detecting the one or more errors comprises at least one of:

determining that a session rule and a policy and charging control (PCC) rule referenced to a same item of policy decision data are inconsistent; or detecting a conflict or inconsistency between two or more rules referenced to a same item of policy decision data.

2. The method of claim 1, wherein the notification is carried in a first request message for a policy control update.

3. The method of claim 2, wherein the first request message for the policy control update comprises an Npcf_SMPolicyControl_Update Request message.

4. The method of claim 2, wherein an updated policy decision is carried in a first response message corresponding to the first request message for the policy control update.

5. The method of claim 4, wherein the first response message corresponding to the first request message for the policy control update comprises an Npcf_SMPolicyControl_Update Response message.

6. The method of claim 1, further comprising receiving an updated policy decision from the second entity, responsive to the notification.

7. The method of claim 1, wherein the first entity is a Session Management Function (SMF) entity, and the second entity is a Policy Control Function (PCF) entity.

8. The method of claim 1, wherein the policy decision comprises a Session Management (SM) policy decision represented by SmPolicyDecision.

9. A method at a second entity, comprising:

sending a policy decision to a first entity, for management of a session by the first entity, the policy decision comprising policy decision data defining quality of service and charging policies for the session, one or more rules defining how to apply the quality of service and charging policies to the session, wherein each rule uses identifiers for referencing into the policy decision data;

receiving a notification from the first entity, the notification indicating one or more reference errors in the policy decision, each reference error being an erroneous or inconsistent reference into the policy decision data;

updating the policy decision to account for the one or more reference errors indicated in the notification; and sending the updated policy decision to the first entity;

wherein the one or more reference errors indicated in the notification include at least one of:

a reference inconsistency in which two or more rules that reference a same item of policy decision data are inconsistent; or a reference error arising from a conflict or inconsistency between a session rule and a policy and charging control (PCC) rule that are both referenced to a same data item in the policy decision data.

10. The method of claim 9, wherein the notification is carried in a first request message for a policy control update.

11. The method of claim 10, wherein the first request message for the policy control update comprises an Npcf_SMPolicyControl_Update Request message.

12. The method of claim 10, wherein the updated policy decision is carried in a first response message corresponding to the first request message for the policy control update.

13. A first entity comprising:

at least one processor, and at least one memory, storing instructions which, when executed on the at least one processor, cause the first entity to:

receive a policy decision from a second entity, for management of a session by the first entity, the policy decision comprising policy decision data defining quality of service and charging policies for the session, and one or more rules defining how to apply the quality of service and charging policies to the session, wherein each rule uses identifiers for referencing into the policy decision data;

detect one or more reference errors in the policy decision, each reference error being an erroneous or inconsistent reference into the policy decision data; and transmit, to the second entity, a notification of the one or more reference errors;

wherein execution of the instructions by the at least one processor causes the first entity to detect the one or more errors by at least one of:

determining that a session rule and a policy and charging control (PCC) rule referenced to a same item of policy decision data are inconsistent; or detecting a conflict or inconsistency between two or more rules referenced to a same item of policy decision data.

14. A second entity comprising:

at least one processor, and at least one memory, storing instructions which, when executed on the at least one processor, cause the second entity to:

send a policy decision to a first entity, for management of a session by the first entity, the policy decision comprising policy decision data defining quality of service and charging policies for the session, and one or more rules defining how to apply the quality of service and charging policies to the session, wherein each rule uses identifiers for referencing into the policy decision data;

receive a notification from the first entity, the notification indicating one or more reference errors in the policy decision, each reference error being an erroneous or inconsistent reference into the policy decision data;

update the policy decision to account for the one or more reference errors indicated in the notification; and send the updated policy decision to the first entity;

wherein the one or more reference errors indicated in the notification include at least one of:

a reference inconsistency in which two or more rules that reference a same item of policy decision data are inconsistent; or a reference error arising from a conflict or inconsistency between a session rule and a policy and charging control (PCC) rule that are both referenced to a same data item in the policy decision data.

* * * * *